(12) United States Patent
Ma et al.

(10) Patent No.: US 11,673,212 B2
(45) Date of Patent: Jun. 13, 2023

(54) OPTICAL PATH/BEAM SPLITTING UNIT AND COAXIAL-WIRE-FEED CLADDING HEAD THEREOF

(71) Applicant: Huazhong University of Science & Technology, Wuhan (CN)

(72) Inventors: Xiuquan Ma, Wuhan (CN); Shaowei Zhou, Wuhan (CN); Gaoyang Mi, Wuhan (CN); Tianyu Xu, Wuhan (CN); Qing Liu, Wuhan (CN)

(73) Assignee: Huazhong University of Science & Technology

( * ) Notice: Subject to any disclaimer, the term of this patent is extended or adjusted under 35 U.S.C. 154(b) by 516 days.

(21) Appl. No.: 16/855,070

(22) Filed: Apr. 22, 2020

(65) Prior Publication Data
US 2021/0197318 A1    Jul. 1, 2021

(30) Foreign Application Priority Data
Dec. 31, 2019    (CN) .......................... 201911411770.4

(51) Int. Cl.
*G02B 7/182* (2021.01)
*B23K 26/342* (2014.01)
(Continued)

(52) U.S. Cl.
CPC .......... *B23K 26/342* (2015.10); *B23K 26/067* (2013.01); *B23K 26/0608* (2013.01);
(Continued)

(58) Field of Classification Search
CPC .. G02B 27/30; G02B 27/149; G02B 26/0816; G02B 19/0047; G02B 19/0019;
(Continued)

(56) References Cited

U.S. PATENT DOCUMENTS

2017/0108698 A1\* 4/2017 Chern .................... G02B 27/30

FOREIGN PATENT DOCUMENTS

| CN | 105499793 A | 4/2016 |
|----|-------------|--------|
| CN | 207326178 U | 5/2018 |

(Continued)

*Primary Examiner* — Christopher Stanford
*Assistant Examiner* — Journey F Sumlar
(74) *Attorney, Agent, or Firm* — Design IP

(57) ABSTRACT

The present invention discloses an optical path/beam splitting unit and a coaxial-wire-feed cladding head thereof. The optical path/beam splitting unit includes an adjustable mirror and at least one stage of beam splitter. Several adjustable mirrors are distributed around the beam splitter. The beam splitter splits an incident laser beam into a plurality of split beams perpendicular to the incident laser beam. The split beams all are focused to a point through the adjustable mirrors. The coaxial-wire-feed cladding head includes a cladding head mirror cavity provided therein with the optical path/beam splitting unit and a wire feeding tube. The wire feeding tube is coaxially arranged with the collimated laser beam. The wire feeding tube extends out of the cladding head mirror cavity. A wire passes through the wire feeding tube and the wire feeding nozzle in order. The adjustable mirrors adjust the focusing of the split beams onto the wire.

12 Claims, 3 Drawing Sheets

(51) Int. Cl.
*B23K 26/06* (2014.01)
*B23K 26/067* (2006.01)
*G02B 19/00* (2006.01)
*G02B 26/08* (2006.01)
*G02B 27/14* (2006.01)
*G02B 27/30* (2006.01)

(52) U.S. Cl.
CPC ...... *B23K 26/0643* (2013.01); *B23K 26/0652* (2013.01); *G02B 7/182* (2013.01); *G02B 19/0019* (2013.01); *G02B 19/0047* (2013.01); *G02B 26/0816* (2013.01); *G02B 27/149* (2013.01); *G02B 27/30* (2013.01)

(58) Field of Classification Search
CPC .. G02B 7/182; B23K 26/067; B23K 26/0652; B23K 26/0643; B23K 26/0608; B23K 26/046; B23K 26/342
See application file for complete search history.

(56) References Cited

FOREIGN PATENT DOCUMENTS

CN 208147143 U 11/2018
DE 202006018356 U1 * 3/2008 ........... B23K 26/067

* cited by examiner

OPTICAL PATH/BEAM SPLITTING UNIT AND COAXIAL-WIRE-FEED CLADDING HEAD THEREOF

CROSS REFERENCE TO RELATED APPLICATION

This application claims the benefit of CN Patent Application No. 201911411770.4, which was filed Dec. 31, 2019 and is incorporated herein by reference as if fully set forth.

TECHNICAL FIELD

The present invention relates to the field of laser cladding, and in particular, to an optical path/beam splitting unit and a coaxial-wire-feed cladding head thereof.

BACKGROUND

With the rapid development of high-power fiber lasers in the past decade, laser surface modification, such as laser surface strengthening, laser surface alloying and laser cladding, have been widely used in the automotive and aerospace fields. Laser cladding and laser multilayer cladding use laser beams to melt wire (or powder) and thin substrate materials. After rapid solidification, these materials form a cladding layer with extremely low dilution and roughly the same composition as the substrate. The method is called laser surface cladding. The cladding is performed by wire feeding (or powder feeding) to form a metallurgical bond between the cladding layer and the substrate. In this way, the wear resistance, corrosion resistance, heat resistance and oxidation resistance of the surface of the substrate are improved.

Laser wire cladding forming uses a metal welding wire instead of a traditional powder as the main material. A wire feeder sends the wire into a molten pool formed by the laser on the substrate. At the same time, part of the laser energy also acts on the wire to form a unique double molten pool phenomenon. As the laser moves, the wire and the substrate melt, bond and cool to form a cladding layer.

Traditional laser powder cladding has low powder utilization and long cladding time, which is not suitable for processing and forming of large and complex components. In addition, the bonding strength between the cladding layer and the substrate is low, and the composition and particle size of the cladding powder will greatly affect the accuracy and performance of the formed part. In contrast, the wire utilization of wire cladding can reach 100%, and the processing efficiency is high, the integrity of the formed part is good, and the performance is stable.

However, most of the currently used wire cladding technologies adopt paraxial wire feeding, which have low processing flexibility and can only form along the wire feeding direction. Because the laser is conical after being focused, the molten pool formed by the laser on the substrate is deviated from droplets formed by the melting of the wire by the laser in the horizontal direction. This will cause the droplets to be difficult to drip into the molten pool on the substrate, resulting in defective cladding, which greatly limits the promotion of wire cladding technology.

To solve the above-mentioned problems of cladding by paraxial wire feeding, Patent Document 1 (publication number: CN 105499793 A) discloses a light path beam-splitting unit of coaxial wire-feeding and depositing laser head. Two ¼ beam splitters with fixed relative positions are used to split a collimated beam into four parallel beams to enter a focusing mirror. The four collimated beams are focused on a wire through a metal oblique plane mirror. This method cannot adjust the final focusing angle of the four beams, so it is difficult to ensure that the four beams are exactly focused on the wire. In this method, a large number of complex optical lenses are used, which are difficult to process and costly for application. In addition, these splitting lenses require a high processing level. They have obvious thermal effect, low beam splitting efficiency and easy divergence of the light path. To achieve a good beam splitting effect, it is necessary to make the beam splitting lens large, which results in a high cost. Patent Document 2 (publication number: CN 208147143 U) discloses a coaxial-wire-feed cladding head for laser metal printing. A solid beam is converted into a ring hollow beam by two cone mirrors, and then the ring beam is split by a ring beam splitter for the feeding of a wire. This method cannot adjust the final focusing angle of the ring beam. Once the wire is slightly bent, it is difficult to ensure that a laser spot falls on the wire. Patent Document 3 (publication number: CN 207326178 U) discloses a laser processing optical system by inside coaxial wire feeding based on wedge mirror scanning, which adopts n identical optical paths to surround a wire feeding mechanism. This method has a complicated structure and requires n laser light sources of the same power, that is, the fiber laser mentioned in Patent Document 3, which has a high implementation cost.

In view of the above problems, the present invention proposes an optical path/beam splitting unit and a coaxial-wire-feed cladding head thereof. The beam splitting unit forms a split beam. The splitting and reversing of the beam uses a mirror, which avoids the disadvantages of a lens such as high processing requirement, obvious thermal effect, low splitting efficiency and easy divergence of optical path. The present invention greatly reduces the energy loss of laser and eliminates the need for a complicated water cooling system. The split beam is perpendicular to an incident laser beam and is in the same plane, so that a beam reflected by an adjustable mirror is in the same plane as the incident laser beam. To adjust the adjustable mirror to ensure a precise focus position on a wire, it is only necessary to adjust an angle of the reflected beam in the same plane. This ensures that the energy of the split beam focused on the top of the wire is evenly distributed, greatly reducing the adjustment difficulty and improving the adjustment accuracy.

SUMMARY

An objective of the present invention is to provide an optical path/beam splitting unit and a coaxial-wire-feed cladding head thereof, so as to solve the above-mentioned problems of the prior art. The beam splitting unit forms a split optical path, so that an adjustable mirror can adjust an angle between a split beam and a wire in a simple manner. In this way, the present invention ensures that the energy of the split beam focused on the top of the wire is evenly distributed and the adjustment accuracy is improved.

To achieve the above purpose, the present invention provides an optical path/beam splitting unit, including adjustable mirrors and at least one stage of beam splitter, where the adjustable mirrors are distributed around the beam splitter; the beam splitter splits an incident laser beam into a plurality of split beams; the split beams are perpendicular to the incident laser beam, and both are in the same plane; each of the split beams is correspondingly irradiated onto a corresponding one of the adjustable mirrors; the several adjustable mirrors adjust the focusing of the split beams to a point.

Preferably, the beam splitter includes a first beam splitter, a second beam splitter and a 22.5° mirror; each of the first beam splitter and the two second beam splitter is a triangular prisms with a cross-section vertex angle being right angle; each of the four 22.5° mirrors is a triangular prism with a cross-section acute angle of 22.5°; a side of the first beam splitter corresponding to the right-angle vertex angle is perpendicular to an incident direction of an incident laser beam to split the incident laser beam evenly into two first beams, wherein each of the two first beams has one half of energy of the incident laser beam; a side of each of the two second beam splitters corresponding to the right-angle vertex angle is perpendicular to the side of the first beam splitter corresponding to the right-angle vertex angle, and is also perpendicular to an incident direction of a corresponding one of the two first beams to split the corresponding one of the two first beams into parallel two second beams, wherein each of the two second beams has one half energy of a corresponding one of the two first beams; the two second beam splitters are symmetrically arranged on both sides of the first beam splitter; each of the two second beams corresponds to a corresponding one of the four 22.5° mirrors; and angle that is between each of the two second beams and a reflecting surface of the corresponding one of the four 22.5° mirrors is 22.5°; each of the two second beams is irradiated to a corresponding one of the adjustable mirrors at an angle of 90° with another adjacent second beam after being reflected by the 22.5° mirror.

Preferably, the beam splitter is a triangular or rectangular pyramid; an incident laser beam is incident on a vertex of the beam splitter; the triangular pyramid evenly splits the incident laser beam into three third beams, wherein each of the three third beams has one third of energy of the incident laser beam; the three third beams are in a same plane and are each irradiated to a corresponding one of the adjustable mirrors; the rectangular pyramid evenly splits the incident laser beam into four fourth beams, wherein each of the four fourth beams has one fourth of the energy of the incident laser beam; the four fourth beams are in a same plane and are each irradiated to a corresponding one of the adjustable mirrors.

Preferably, the optical path/beam splitting unit further includes a light source collimation module, where the light source collimation module irradiates the collimated laser beam onto the beam splitter.

The present invention further provides a coaxial-wire-feed cladding head using the above optical path/beam splitting unit, including a cap and a cladding head mirror cavity, where the cladding head mirror cavity is provided therein with the optical path/beam splitting unit and a wire feeding tube; the cap is provided thereon with the light source collimation module; the wire feeding tube is coaxially arranged with the collimated laser beam; the wire feeding tube extends out of the cladding head mirror cavity and is provided with a wire feeding nozzle at the bottom; a wire passes through the wire feeding tube and the wire feeding nozzle in order; the adjustable mirror adjusts the focusing of the split beam onto the wire protruding from the wire feeding nozzle.

Preferably, the adjustable mirror is mounted on a two-dimensional optical bracket, and the light source collimation module is provided with a QBH mount.

Preferably, a channel is opened on the cap; the channel extends into the cladding head mirror cavity to communicate with the wire feeding tube.

Preferably, a wire feeding round hole is arranged in the center of the wire feeding tube, and a plurality of ventilation round holes are evenly distributed around.

Preferably, an aspheric focusing mirror is further arranged in a propagation direction of the split beam reflected by the adjustable mirror.

Preferably, the aspheric focusing mirror is installed in the focusing mirror cavity; the focusing mirror cavity is provided therein with a Z-axis focal length setting mechanism; the focusing mirror cavity is further provided with a protection mirror cavity in a propagation direction of the beam; the protection mirror cavity is provided therein with a focusing mirror protection mirror; the focusing mirror protection mirror is parallel to the aspheric focusing mirror.

Compared with the prior art, the present invention achieves the following technical effects.

1. In the present invention, the beam splitting unit forms a split beam. The splitting and reversing of the beam uses a mirror, which avoids the disadvantages of a lens such as high processing requirement, obvious thermal effect, low splitting efficiency and easy divergence of optical path. The present invention greatly reduces the energy loss of laser and eliminates the need for a complicated water cooling system. The split beam is perpendicular to an incident laser beam and is in the same plane, so that a beam reflected by an adjustable mirror is in the same plane as the incident laser beam. To adjust the adjustable mirror to ensure a precise focus position on the wire, it is only necessary to adjust an angle of the reflected beam in the same plane. This ensures that the energy of the split beam focused on the top of the wire is evenly distributed, greatly reducing the adjustment difficulty and improving the adjustment accuracy.

2. The present invention uses a plurality of beam splitters to evenly split a collimated beam into four paths. This method has a simple structure and high splitting efficiency. After the collimated beam passes through a primary beam splitter, the power of two beams generated become ½ of the original, and after passing through a secondary beam splitter, the energy becomes ¼ of the original. The beam has a fan-shaped cross section with a center angle of 90°. In this way, an aspheric focusing mirror and a protection mirror thereof greatly reduce their thermal effect.

3. The present invention utilizes a 22.5° mirror to reflect two opposite ¼ beams to the same plane as a wire feeding tube, which is convenient for adjusting an angle between the beam and the wire feeding tube.

4. The present invention adopts four two-dimensional optical brackets to adjust a reflection angle α of the ¼ beams on the adjustable mirrors to ensure that the ¼ beams are all focused on the top of the wire.

5. The present invention passes the wire and shield gas directly through a channel to the wire feeding tube. The wire feeding tube is hollow in the center for wire feeding and is provided with n small holes around for gas feeding, so as to achieve the purpose of coaxial wire feeding and shield gas blowing.

BRIEF DESCRIPTION OF DRAWINGS

To describe the technical solutions in the embodiments of the present invention or in the prior art more clearly, the following briefly describes the accompanying drawings required for the embodiments. Apparently, the accompanying drawings in the following description show merely some embodiments of the present invention, and a person of ordinary skill in the art may still derive other accompanying drawings from these accompanying drawings without creative efforts.

1. collimated laser beam, 2. 22.5° mirror, 3. adjustable mirror, 4. two-dimensional optical bracket, 5. aspheric focusing mirror, 6. focusing mirror protection mirror, 7. second beam splitter, 8. first beam splitter, 9. channel, 10. wire feeding tube, 11. wire feeding nozzle, 12. QBH mount, 13. light source collimation module, 14. connection bracket, 15. cap, 16. focusing mirror cavity, 17. protection mirror cavity, and 18. cladding head mirror cavity.

DETAILED DESCRIPTION

The following clearly and completely describes the technical solutions in the embodiments of the present invention with reference to accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

An objective of the present invention is to provide an optical path/beam splitting unit and a coaxial-wire-feed cladding head thereof, so as to solve the problems of the prior art. The beam splitting unit forms a split optical path, so that an adjustable mirror can adjust an angle between a split beam and a wire. In this way, the present invention ensures that a wire droplet is exactly located above a molten pool on a substrate during coaxial wire feeding and the energy of the split beam focused on the top of the wire is evenly distributed.

To make the above objects, features, and advantages of the present invention more obvious and easy to understand, the present invention will be further described in detail with reference to the accompanying drawings and the detailed description.

Embodiment 1

Figure 1:
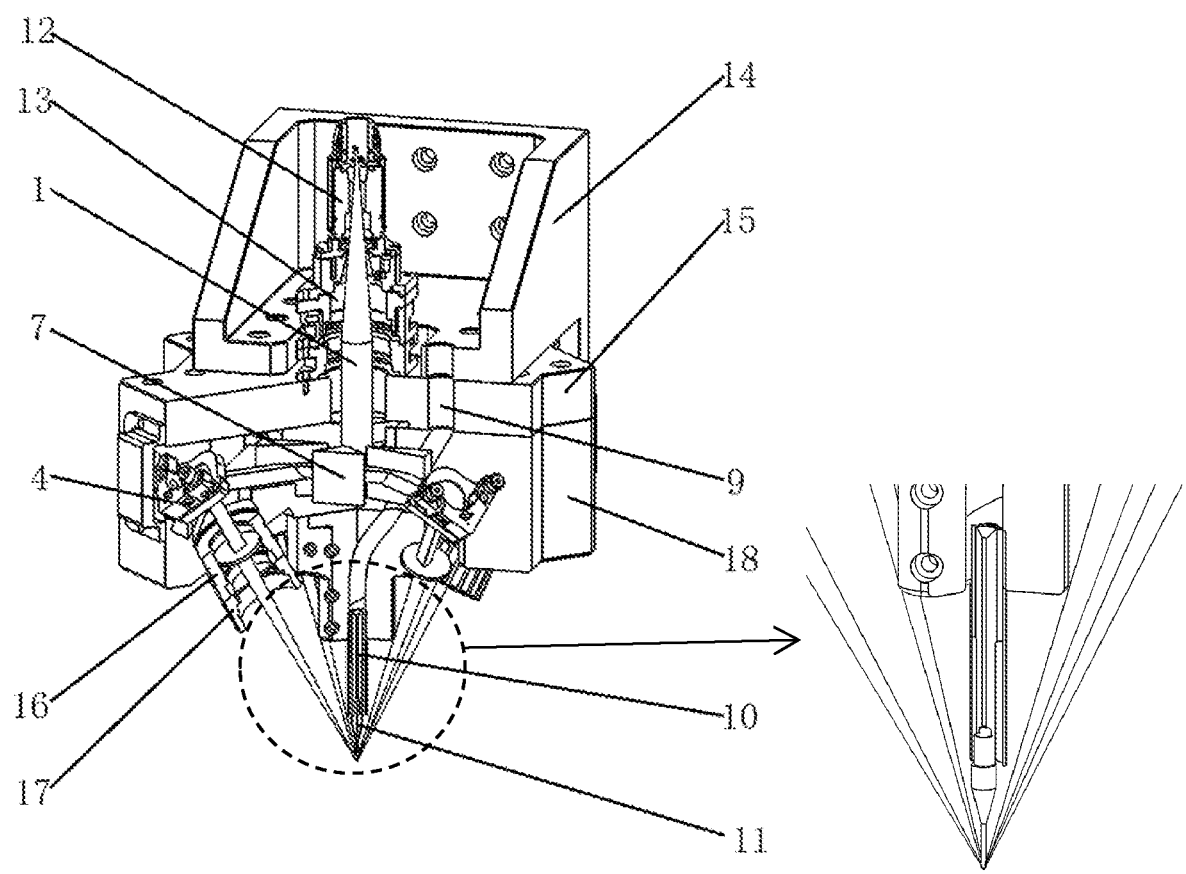
FIG. 1 is a sectional view of a coaxial-wire-feed cladding head.

As shown in FIG. 1, the present invention provides a coaxial-wire-feed cladding head, including a connection bracket 14, a cap 15 and a cladding head mirror cavity 18. The cladding head mirror cavity 18 is provided therein with an optical path/beam splitting unit and a wire feeding tube 10. The cap 15 is provided thereon with a light source collimation module 13. The wire feeding tube 10 is coaxially arranged with a collimated laser beam 1. The wire feeding tube 10 extends out of the cladding head mirror cavity 18 and is provided with a wire feeding nozzle 11 at the bottom. A wire passes through the wire feeding tube 10 and the wire feeding nozzle 11 in order. An adjustable mirror 3 adjusts the focusing of a split beam onto the wire protruding from the wire feeding nozzle 11.

The collimated laser beam 1 uses a laser as a light source. After collimating by the light source collimation module 13, a parallel beam is generated. The energy of the beam is evenly distributed and the beam is a flat-topped circular spot. The connection bracket 14 is used to install and connect the wire-feed cladding head to a robot arm or a machine tool. The wire feeding nozzle 11 can be replaced according to different diameters of wires, and the wire feeding nozzle is made of copper to prevent absorption of laser radiation.

Figure 3:
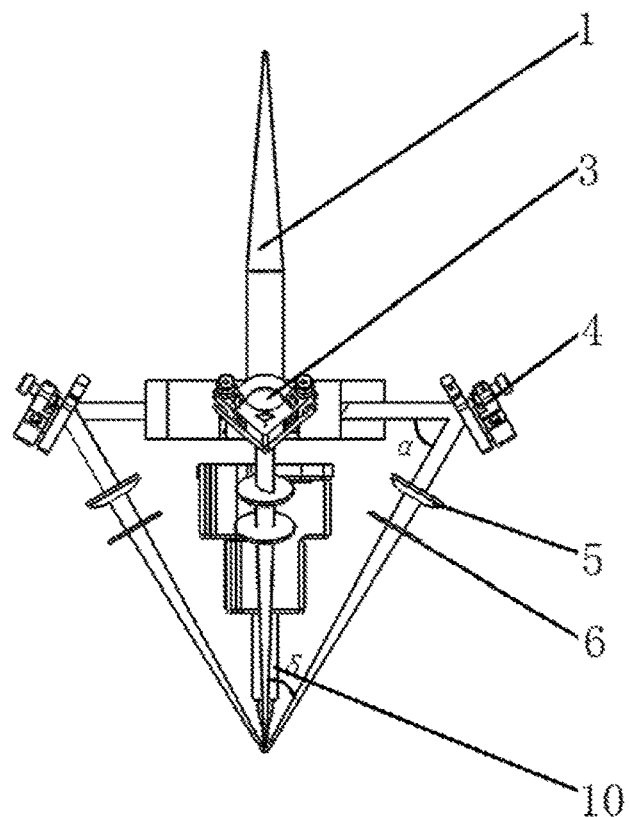
FIG. 3 is a diagram showing the adjustment of an angle of an optical path of an optical path/beam splitting unit.

As shown in FIG. 3, the adjustable mirror 3 can adjust a reflection angle $\alpha$ of a ¼ beam to make an angle $\delta$ between the ¼ beam and the wire adjustable, where $\alpha+\delta=90°$. A total of four adjustable mirrors 3 are respectively mounted on four two-dimensional optical brackets 4, and a fine adjustment knob on the two-dimensional optical brackets 4 can precisely adjust the reflection angle $\alpha$.

Figure 2:
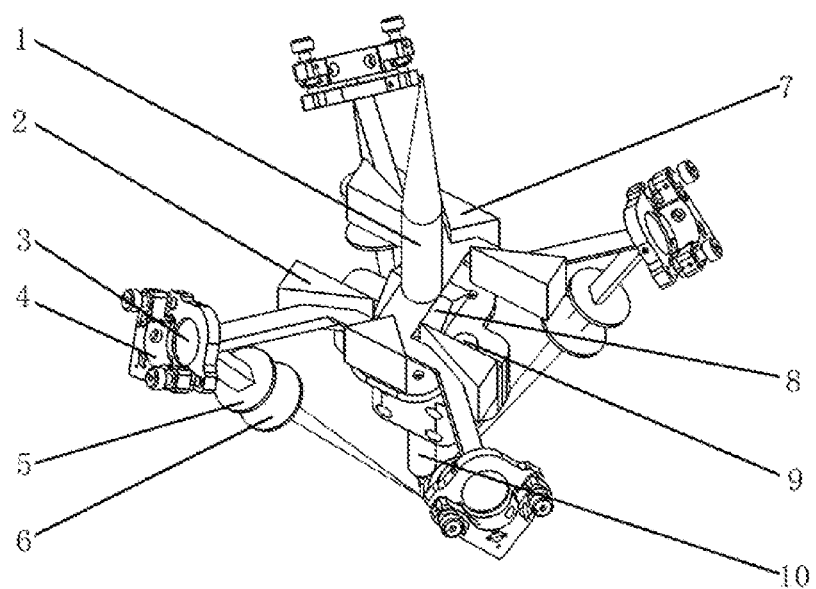
FIG. 2 is a schematic diagram of an optical path of a quartering optical path/beam splitting unit.

As shown in FIG. 2, the present invention provides an optical path/beam splitting unit, including an adjustable mirror and a two-stage beam splitter. The beam splitter includes a first beam splitter 8, a second beam splitter 7 and a 22.5° mirror 2. The first beam splitter 8 and the second beam splitter 7 are triangular prisms with a cross-section vertex angle being right angle. The 22.5° mirror 2 is a triangular prism with a cross-section acute angle of 22.5°. A side of the first beam splitter 8 corresponding to the right-angle vertex angle is perpendicular to an incident direction of an incident laser beam to split the incident laser beam evenly into ½ beams (i.e., first beam). A side of the second beam splitter 7 corresponding to the right-angle vertex angle is perpendicular to the side of the first beam splitter 8 corresponding to the right-angle vertex angle, and is also perpendicular to an incident direction of the ½ beams to split the ½ beams into parallel ¼ beams (i.e., second beam). There are two second beam splitters 7, which are symmetrically arranged on both sides of the first beam splitter 8. There are four 22.5° mirrors 2, each corresponding to a ¼ beam. A reflecting surface of the 22.5° mirror 2 is 22.5° with a ¼ beam. The ¼ beams are irradiated to the adjustable mirror 3 at an angle of 90° with each other after being reflected by the 22.5° mirror 2.

Figure 4:
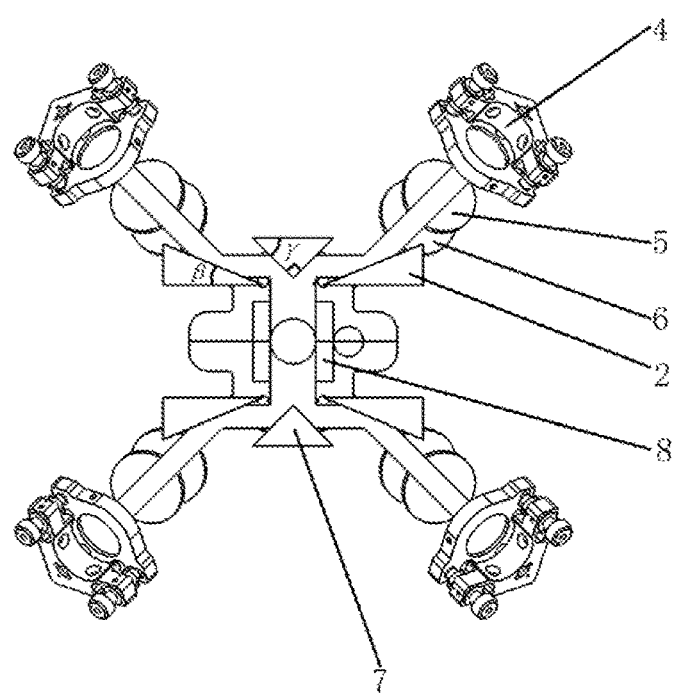
FIG. 4 is a schematic diagram of a quartering optical path/beam splitting unit.
Figure 5:
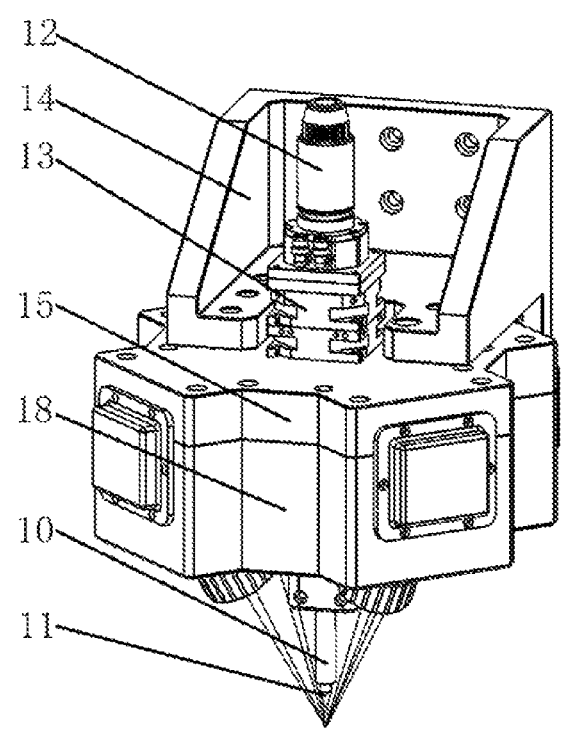
FIG. 5 is an overall structural diagram of a coaxial-wire-feed cladding head.

As shown in FIG. 4, the reflecting surface of the 22.5° mirror 2 and the incident direction of the ¼ beam have a $\beta$ angle, $\beta=22.5°$. There are a total of four 22.5° mirrors 2. The ¼ beam reflected by the 22.5° mirror 2 is in the same plane as the wire feeding tube 10, which is convenient for adjusting an angle between the wire and the beam later. The 22.5° mirrors 2 are installed in the cladding head mirror cavity 18 through a pressing block, and the installation positions of the four 22.5° mirrors 2 are symmetrical up and down.

As shown in FIG. 1 to FIG. 3, the adjustable mirror 3 is mounted on the two-dimensional optical bracket 4, and the light source collimation module 13 is provided with a QBH mount 12.

As shown in FIG. 1 and FIG. 2, a channel 9 is opened on the cap 15. The channel 9 extends into the cladding head mirror cavity 18 to communicate with the wire feeding tube 10. The channel 9 communicates the wire feeding tube 10 with the connection bracket 14 and is used for a wire feeder to feed the wire into the wire feeding tube 10. At the same time, shield gas is also fed into the wire feeding tube 10 from the channel 9 to achieve the purpose of coaxial wire feeding and shield gas feeding.

As shown in FIG. 1, a wire feeding round hole is arranged in the center of the wire feeding tube 10, and a plurality of ventilation round holes are evenly distributed around. Existing coaxial wire feeding heads adopt side blowing of shield gas. During cladding, the side blowing of shield gas will cause a molten droplet to deflect to drip under a side force, making it difficult to ensure accurate cladding. In the present invention, the center of the wire feeding tube 10 is hollow for coaxial wire feeding, and n pipes (n>6) are evenly distributed around for coaxial shield gas feeding, thereby achieving the purpose of coaxial wire feeding and shield gas feeding.

As shown in FIG. 1 to FIG. 3, an aspheric focusing mirror 5 is further arranged in a propagation direction of the split beam reflected by the adjustable mirror 3. The aspheric focusing mirror 5 is installed in the focusing mirror cavity 16. The focusing mirror cavity 16 is provided therein with a Z-axis focal length setting mechanism. The focusing mirror cavity 16 is further provided with a protection mirror cavity 17 in a propagation direction of the beam. The protection mirror cavity 17 is provided therein with a focusing mirror protection mirror 6. The focusing mirror protection mirror 6 is parallel to the aspheric focusing mirror 5.

There are four aspheric focusing mirrors 5 for focusing the ¼ beams. The focusing mirror protection mirror 6 is used to protect the aspheric focusing mirror 5 from dust during cladding. The protection mirror cavity 17 is installed on the focusing mirror cavity 16 through a thread, which is quick for disassembly to facilitate replacement of the focusing mirror protection mirror 6.

A specific beam splitting process of the present invention is as follows.

The present invention uses a laser as a light source. Take a 4 kW fiber laser with a wavelength of 1080 nm as an example, 4 kW laser is emitted from QBH (the energy distribution of the 4 kW light source is Gaussian at this time). After the laser passes through the light source collimation module 13, a divergent laser beam is shaped into a cylindrical beam, that is, the collimated laser beam 1 (at this time, the energy distribution of the beam is flat-topped even distribution). The collimated laser beam 1 is perpendicularly incident on the first beam splitter 8, and is split into two ½ beams by two mutually perpendicular reflecting surfaces on the first beam splitter 8. The two ½ beams emit in opposite directions and are perpendicular to the original collimated laser beam 1. Each ½ beam has 2 kW energy and a semicircular cross section. As shown in FIG. 4, the two ½ beams are perpendicularly incident on the second beam splitter 7 on the upper and lower sides. Each ½ beam is split into two ¼ beams by two mutually perpendicular reflecting surfaces of the second beam splitter 7. Two ¼ beams on the same side emit in opposite directions and are perpendicular to the original ½ beam. Each ¼ beam has 1 kW energy and a fan-shaped cross section with a center angle of 90°. At this time, as shown in FIG. 4, the four ¼ beams are incident on the reflecting surfaces of the 22.5° mirrors 2 on left and right sides respectively and are reflected to form 135° with the original ¼ beams. After being reflected by the four 22.5° mirrors 2, the four ¼ beams are respectively irradiated to four adjustable mirrors 3, at an angle of 90° with an adjacent beam. Through the reflection of the adjustable mirrors 3, the four ¼ beams are irradiated to the aspheric focusing mirror 5 at an angle α with the original light. Then, the four ¼ beams are focused by the aspheric focusing mirror 5 from four directions to the top of the wire.

Embodiment 2

This embodiment provides an optical path/beam splitting unit. Based on Embodiment 1, this embodiment uses a triangular pyramid beam splitter. An incident laser beam is incident on a vertex of the beam splitter. The triangular pyramid evenly splits a collimated laser beam into three ⅓ beams (i.e., third beam). The ⅓ beams are in the same plane and are irradiated to an adjustable mirror.

Embodiment 3

This embodiment provides an optical path/beam splitting unit. Based on Embodiment 1, this embodiment uses a rectangular pyramid beam splitter. An incident laser beam is incident on a vertex of the beam splitter. The rectangular pyramid evenly splits a collimated laser beam into four ¼ beams (i.e., fourth beam). The ¼ beams are in the same plane and are irradiated to an adjustable mirror.

Several examples are used for illustration of the principles and implementations of the present invention. The description of the embodiments is only used to help illustrate the method and its core ideas of the present invention. In addition, persons skilled in the art can make various modifications in terms of specific embodiments and scope of application in accordance with the teachings of the present invention. In conclusion, the content of this specification shall not be construed as a limitation to the present invention.

What is claimed is:

1. A coaxial-wire-feed cladding head using an optical path/beam splitting unit, the optical path/beam splitting unit comprising adjustable mirrors and at least one stage of beam splitter, wherein the adjustable mirrors are distributed around the beam splitter; the beam splitter splits an incident laser beam into a plurality of split beams; the split beams are perpendicular to the incident laser beam, and bother are in the same plane; each of the split beams is correspondingly irradiated onto a corresponding one of the adjustable mirrors, the adjustable mirrors adjust the focusing of the split beams to a point;

the coaxial-wire-feed cladding head comprising a cap and a cladding head mirror cavity, wherein the cladding head mirror cavity is provided therein with the optical path/beam splitting unit and a wire feeding tube; the cap is provided thereon with a light source collimation module; the wire feeding tube is coaxially arranged with the collimated laser beam; the wire feeding tube extends out of the cladding head mirror cavity and is provided with a wire feeding nozzle at the bottom; a wire passes through the wire feeding tube and the wire feeding nozzle in order; the adjustable mirrors adjust the focusing of the split beams onto the wire protruding from the wire feeding nozzle.

2. The coaxial-wire-feed cladding head according to claim 1, wherein at least one of the adjustable mirrors is mounted on a two-dimensional optical bracket, and the light source collimation module is provided with a QBH mount.

3. The coaxial-wire-feed cladding head according to claim 1, wherein a channel is opened on the cap; the channel extends into the cladding head mirror cavity to communicate with the wire feeding tube.

4. The coaxial-wire-feed cladding head according to claim 1, wherein a wire feeding round hole is arranged in the center of the wire feeding tube, and a plurality of ventilation round holes are evenly distributed around.

5. The coaxial-wire-feed cladding head according to claim 1, wherein an aspheric focusing mirror is further arranged in a propagation direction of the plurality of split beams reflected by the adjustable mirrors.

6. The coaxial-wire-feed cladding head according to claim 5, wherein the aspheric focusing mirror is installed in a focusing mirror cavity; the focusing mirror cavity is provided therein with a Z-axis focal length setting mechanism; the focusing mirror cavity is further provided with a protection mirror cavity in a propagation direction of the beam; the protection mirror cavity is provided therein with a focusing mirror protection mirror; the focusing mirror protection mirror is parallel to the aspheric focusing mirror.

7. A coaxial wire-feed cladding head using an optical path/beam splitting unit, the optical path/beam splitting unit comprising adjustable mirrors and at least one stage of beam splitter, wherein the adjustable mirrors are distributed around the beam splitter; the beam splitter splits an incident later beam into a plurality of split beams; the split beams are perpendicular to the incident laser beam, and both are in the same plane; each of the split beams is correspondingly irradiated onto a corresponding one of the adjustable mirrors, the adjustable mirrors adjust the focusing of the split beams to a point;

wherein the beam splitter comprises a first beam splitter, two second beam splitters and four 22.5° mirrors; each of the first beam splitter and the two second beam splitters is a triangular prism with a cross-section vertex angle being right angle; each of the four 22.5° mirrors is a triangular prism with a cross-section acute angle of 22.5°; a side of the first beam splitter corresponding to a right-angle vertex angle is perpendicular to an incident direction of an incident laser beam to split the incident laser beam evenly into two first beams, wherein each of the two first beams has one half of energy of the incident laser beam; a side of each of the two second beam splitters corresponding to the right-angle vertex angle is perpendicular to the side of the first beam splitter corresponding to the right-angle vertex angle, and is also perpendicular to an incident direction of a corresponding one of the two first beams to split the corresponding one of the two first beams into parallel two second beams, wherein each of the two second beams has one half of energy of a corresponding one of the two first beams; the two second beam splitters are symmetrically arranged on both sides of the first beam splitter; each of the two second beams corresponds to a corresponding one of the four 22.5° mirrors; an angle that is between each of the two second beams and a reflecting surface of the corresponding one of the four 22.5° mirrors is 22.5°; each of the two second beams is irradiated to a corresponding one of the adjustable mirrors at an angle of 90° with another adjacent second beam after being reflected by the 22.5° mirror;

the coaxial-wire-feed cladding head comprising a cap and a cladding head mirror cavity, wherein the cladding head mirror cavity is provided therein with the optical path/beam splitting unit and a wire feeding tube; the cap is provided thereon with the light source collimation module; the wire feeding tube is coaxially arranged with the collimated laser beam; the wire feeding tube extends out of the cladding head mirror cavity and is provided with a wire feeding nozzle at the bottom; a wire passes through the wire feeding tube and the wire feeding nozzle in order; the adjustable mirror adjusts the focusing of the split beam onto the wire protruding from the wire feeding nozzle.

8. The coaxial-wire-feed cladding head according to claim 7, wherein at least one of the adjustable mirrors is mounted on a two-dimensional optical bracket, and the light source collimation module is provided with a QBH mount.

9. The coaxial-wire-feed cladding head according to claim 7, wherein a channel is opened on the cap; the channel extends into the cladding head mirror cavity to communicate with the wire feeding tube.

10. The coaxial-wire-feed cladding head according to claim 4, wherein a wire feeding round hole is arranged in the center of the wire feeding tube, and a plurality of ventilation round holes are evenly distributed around.

11. A coaxial-wire-feed cladding head using an optical path/beam splitting unit, the optical path/beam splitting unit comprising adjustable mirrors and at least one stage of beam splitter, wherein the adjustable mirrors are distributed around the beam splitter; the beam splitter splits an incident later beam into a plurality of split beams; the split beams are perpendicular to the incident laser beam, and both are in the same plane; each of the split beams is correspondingly irradiated onto a corresponding one of the adjustable mirrors, the adjustable mirrors adjust the focusing of the split beams to a point;

wherein the beam splitter is a triangular or rectangular pyramid; the incident laser beam is incident on a vertex of the beam splitter; the triangular pyramid evenly splits the incident laser beam into three third beams, wherein each of the three third beams has one third of energy of the incident laser beam; the three third beams are in a same plane and are each irradiated to a corresponding one of the adjustable mirrors; the rectangular pyramid evenly splits the incident laser beam into four fourth beams, wherein each of the four fourth beams has one fourth of the energy of the incident laser beam; the four fourth beams are in a same plane and are each irradiated to a corresponding one of the adjustable mirrors;

the coaxial-wire-feed cladding head comprising a cap and a cladding head mirror cavity, wherein the cladding head mirror cavity is provided therein with the optical path/beam splitting unit and a wire feeding tube; the cap is provided thereon with the light source collimation module; the wire feeding tube is coaxially arranged with the collimated laser beam; the wire feeding tube extends out of the cladding head mirror cavity and is provided with a wire feeding nozzle at the bottom; a wire passes through the wire feeding tube and the wire feeding nozzle in order; the adjustable mirror adjusts the focusing of the split beam onto the wire protruding from the wire feeding nozzle.

12. A coaxial-wire-feed cladding head using an optical path/beam splitting unit, the optical path/beam splitting unit comprising adjustable mirrors and at least one stage of beam splitter, wherein the adjustable mirrors are distributed around the beam splitter; the beam splitter splits an incident later beam into a plurality of split beams; the split beams are perpendicular to the incident laser beam, and both are in the same plane; each of the split beams is correspondingly irradiated onto a corresponding one of the adjustable mirrors, the adjustable mirrors adjust the focusing of the split beams to a point;

the optical path/beam splitting unit further comprising a light source collimation module, wherein the light source collimation module irradiates the collimated laser beam onto the beam splitter;

the coaxial-wire-feed cladding head comprising a cap and a cladding head mirror cavity, wherein the cladding head mirror cavity is provided therein with the optical path/beam splitting unit and a wire feeding tube; the cap is provided thereon with the light source collimation module; the wire feeding tube is coaxially arranged with the collimated laser beam; the wire feeding tube extends out of the cladding head mirror cavity and is provided with a wire feeding nozzle at the bottom; a wire passes through the wire feeding tube and the wire feeding nozzle in order; the adjustable mirror adjusts the focusing of the split beam onto the wire protruding from the wire feeding nozzle.

\* \* \* \* \*